United States Patent
Oh

(10) Patent No.: US 10,153,529 B2
(45) Date of Patent: Dec. 11, 2018

(54) APPARATUS AND METHOD FOR ESTIMATING STATE OF CHARGE OF METAL-AIR BATTERY

(71) Applicant: Samsung Electronics Co., Ltd., Suwon-si (KR)

(72) Inventor: Duk-Jin Oh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 626 days.

(21) Appl. No.: 14/832,474

(22) Filed: Aug. 21, 2015

(65) Prior Publication Data

US 2016/0268660 A1   Sep. 15, 2016

(30) Foreign Application Priority Data

Mar. 11, 2015  (KR) .................. 10-2015-0033721

(51) Int. Cl.
 *H01M 12/08*  (2006.01)
(52) U.S. Cl.
 CPC ........ *H01M 12/08* (2013.01); *H01M 2220/20* (2013.01); *Y02E 60/128* (2013.01)
(58) Field of Classification Search
 CPC .. H01M 12/08; H01M 2220/20; Y02E 60/128
 USPC ........................................................ 429/403
 See application file for complete search history.

(56) References Cited

U.S. PATENT DOCUMENTS

| | | |
|---|---|---|
| 7,049,792 B2 | 5/2006 | King |
| 8,557,414 B2 | 10/2013 | Hermann et al. |
| 2012/0041628 A1* | 2/2012 | Hermann .......... H01M 8/04089 701/22 |

FOREIGN PATENT DOCUMENTS

| | | |
|---|---|---|
| JP | 2007-501492 A | 1/2007 |
| JP | 2012-57956 A | 3/2012 |
| JP | 2013-113852 A | 6/2013 |
| JP | 2013-253857 A | 12/2013 |

OTHER PUBLICATIONS

L. Jörissen, "Bifunctional oxygen/air electrodes," *Journal of Power Sources*, vol. 155, No. 1, Apr. 18, 2006, pp. 23-32, available online Dec. 15, 2005.

* cited by examiner

*Primary Examiner* — Gary D Harris
(74) *Attorney, Agent, or Firm* — NSIP Law

(57) ABSTRACT

An apparatus for estimating a state of charge (SoC) of a metal-air battery includes a measurer configured to measure an amount of oxygen consumption of the metal-air battery; and an estimator configured to estimate the SoC of the metal-air battery based on the measured amount of oxygen consumption.

22 Claims, 7 Drawing Sheets

APPARATUS AND METHOD FOR ESTIMATING STATE OF CHARGE OF METAL-AIR BATTERY

CROSS-REFERENCE TO RELATED APPLICATION(S)

This application claims the benefit under 35 USC 119(a) of Korean Patent Application No. 10-2015-0033721 filed on Mar. 11, 2015, in the Korean Intellectual Property Office, the entire disclosure of which is incorporated herein by reference for all purposes.

BACKGROUND

1. Field

The following description relates to an apparatus and a method for estimating a state of charge (SoC) of a metal-air battery.

2. Description of Related Art

With an increase in emission of carbon dioxide due to consumption of fossil fuels and a dramatic change in crude oil prices, efforts to change an energy source for a vehicle from gasoline or diesel to electrical energy have been receiving attention.

Some electric vehicles have been commercialized, and lithium-ion batteries are expected to have a higher performance and be manufactured at a lower cost as a rechargeable battery for long-distance travel. However, currently used lithium-ion batteries have a restricted capacity and are unsuitable for long-distance travel. Thus, mounting a large quantity of the lithium-ion batteries on an electric vehicle may be necessary, and causing a price of the electric vehicle to increase considerably.

An energy density approximately six or seven times higher than a current energy density level is necessary to popularize electric vehicles. Thus, metal-air batteries, which, in theory, have a much higher energy density than lithium-ion batteries, are attracting interest.

A metal-air battery includes an anode, a cathode, an electrolyte, and a separation membrane. In the anode of the metal-air battery, an oxidation-reduction reaction of metal occurs. In the cathode of the metal-air battery, an oxidation-reduction reaction of oxygen flowing into the cathode from an outside source occurs. A theoretical energy density of the metal-air battery is significantly higher than other secondary batteries.

A conventional method of estimating a state of charge (SoC) of a battery in a conventional battery management system (BMS) includes integrating a current flowing in the battery and estimating the SoC of the battery based on the integrated current. However, such a method has an issue in that an accuracy of the estimating of the SoC decreases over time because errors that occur in a process of measuring a current are continuously accumulated.

Another conventional method of estimating an SoC of a battery includes measuring a voltage of a secondary battery, estimating an open circuit voltage (OCV) of the secondary battery in a no-load state based on the measured voltage, and estimating the SoC by referring to an SoC table for each OCV. However, such a method has an issue in that an accuracy in the estimating of the SoC decreases because increasing accuracy in the estimating of the OCV may not be easy during a charging and discharging state of the secondary battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for estimating a state of charge (SoC) of a metal-air battery includes a measurer configured to measure an amount of oxygen consumption of the metal-air battery; and an estimator configured to estimate the SoC of the metal-air battery based on the measured amount of oxygen consumption.

The measurer may include a first measurer configured to measure an amount of oxygen flowing into the metal-air battery; and a second measurer configured to measure an amount of oxygen flowing out of the metal-air battery.

The first measurer may include a first flow amount measurer configured to measure an amount of air flowing into a cathode of the metal-air battery; and a first concentration measurer configured to measure an oxygen concentration of the air flowing into the cathode of the metal-air battery.

The second measurer may include a second flow amount measurer configured to measure an amount of air flowing out of a cathode of the metal-air battery; and a second concentration measurer configured to measure an oxygen concentration of the air flowing out of the cathode of the metal-air battery.

The measurer may further include an oxygen amount calculator configured to calculate an amount of oxygen consumption of a cathode of the metal-air battery based on the amount of oxygen flowing into the cathode of the metal-air battery and the amount of oxygen flowing out of the cathode of the metal-air battery.

The estimator may be further configured to calculate an amount of change in electrical charges of a cathode of the metal-air battery based on the amount of oxygen consumption.

The estimator may be further configured to estimate the SoC of the metal-air battery based on the calculated amount of change in electrical charges of the metal-air battery.

In another general aspect, a method of estimating a state of charge (SoC) of a metal-air battery includes measuring an amount of oxygen consumption of the metal-air battery; and estimating the SoC of the metal-air battery based on the measured amount of oxygen consumption.

The measuring of the amount of oxygen consumption may include measuring an amount of oxygen flowing into a cathode of the metal-air battery; and measuring an amount of oxygen flowing out of the cathode of the metal-air battery.

The measuring of the amount of oxygen flowing into the cathode may include measuring an amount of air flowing into the cathode of the metal-air battery; and measuring an oxygen concentration of the air flowing into the cathode of the metal-air battery.

The measuring of the amount of oxygen flowing out of the cathode may include measuring an amount of air flowing out of the cathode of the metal-air battery; and measuring an oxygen concentration of the air flowing out of the cathode of the metal-air battery.

The measuring of the amount of oxygen consumption of the metal-air battery may further include calculating an amount of oxygen consumption of the cathode of the metal-air battery based on the amount of oxygen flowing into the cathode of the metal-air battery and the amount of oxygen flowing out of the cathode of the metal-air battery.

The estimating of the SoC of the metal-air battery may include calculating an amount of change in electrical charges of the metal-air battery based on the amount of oxygen consumption.

The estimating of the SoC of the metal-air battery may further include estimating the SoC of the metal-air battery based on the calculated amount of change in electrical charges of the metal-air battery.

In another general aspect a non-transitory computer-readable storage medium stores instructions for causing computing hardware to perform the method described above.

In another general aspect, an apparatus for estimating a state of charge (SoC) of a battery includes a measurer configured to measure an amount of consumption of an electrode of the battery; and an estimator configured to estimate the SoC of the battery based on the measured amount of consumption of the electrode.

The measurer may include a first measurer configured to measure an amount of a material consumed during discharge of the battery, the material including an active material of the electrode of the battery; a second measurer configured to determine a concentration of the active material in the material consumed during discharge of the battery; and a calculator configured to calculate the amount of consumption of the electrode of the battery by multiplying the measured amount of the material consumed during discharge of the battery by the measured concentration of the active material.

The estimator may be further configured to calculate an amount of change in electrical charges of the battery based on the measured amount of consumption of the electrode.

The estimator may be further configured to estimate the SoC of the battery based on the calculated amount of change in electrical charges of the battery.

The battery may be a metal-air battery, and the electrode of the battery may be air.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not intended to limit the disclosure. As used herein, the singular forms "a," "an," and "the" are intended to include the plural forms as well, unless the context clearly indicates otherwise. The terms "include" and "have," when used in this disclosure, specify the presence of stated features, numbers, operations, elements, components or combinations thereof, but do not preclude the presence or addition of one or more other features, numbers, operations, elements, components, or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
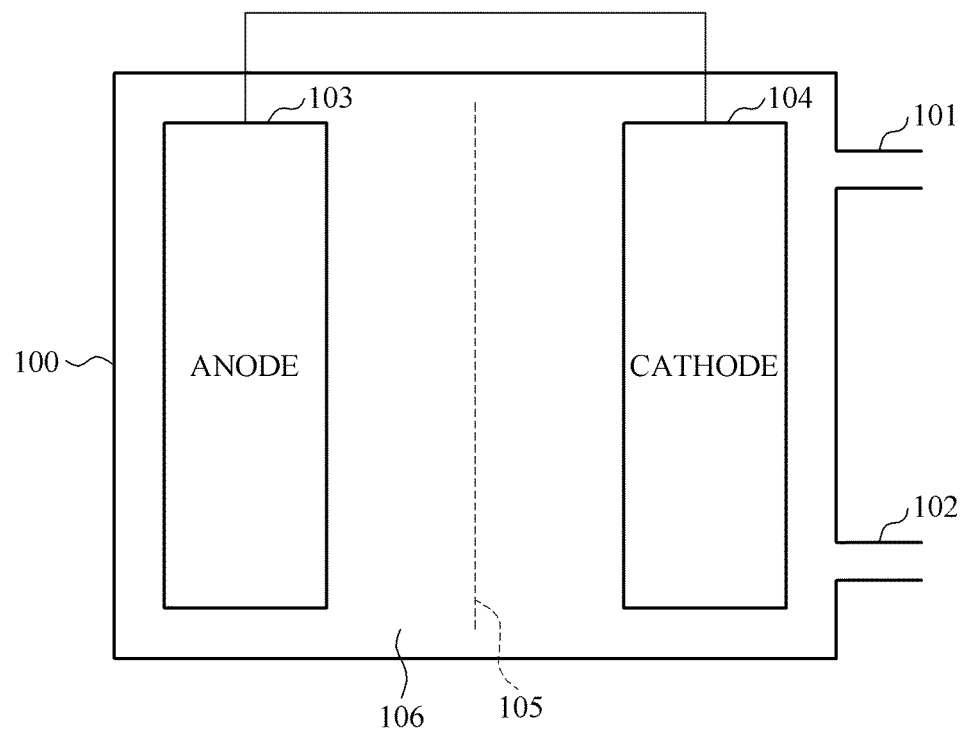
FIG. 1 is a diagram illustrating an example of a metal-air battery.

FIG. 1 is a diagram illustrating an example of a metal-air battery 100.

Referring to FIG. 1, the metal-air battery 100 includes an anode 103 that is a negative electrode of the metal-air battery 100, a cathode 104 that is a positive electrode of the metal-air battery 100, an electrolyte 106 that is a medium through which materials move between the anode 103 and the cathode 104, and a separation membrane 105 configured to prevent contact between the anode 103 and the cathode 104. Any one or any combination of any two or more of zinc (Zn), aluminum (Al), sodium (Na), magnesium (Mg), iron (Fe), and lithium (Li) may be used for the anode 103 that is the negative electrode of the metal-air battery 100. The cathode 104 that is the positive electrode of the metal-air battery 100 undergoes an oxidation or reduction reaction using oxygen in air that flows into an inlet 101 and flows out of an outlet 102.

The metal-air battery 100 is a secondary battery that combines metal, for example, any one or any combination of any two or more of Zn, Al, Na, Mg, Fe, and Li, with oxygen in air and generates electricity. An existing lithium-ion battery operates based on an oxygen-reduction reaction of a transition metal in an ionic bonding crystal structure formed with a lithium ion, a transition metal ion, and an oxygen ion. Thus, currently commercialized representative electrode materials include heavy transition metals, for example, cobalt (Co), manganese (Mn), and Fe. However, in the metal-air battery 100, metal and oxygen are directly combined in the cathode 104 in a porous carbon structure, and thus the metal and oxygen are able to directly participate in an oxygen-reduction reaction without a heavy transition metal. Thus, the metal-air battery 100 has a higher theoretical capacity than other types of batteries because a relatively heavy transition metal is not used. A lithium-ion secondary battery has an energy density of approximately 140 watt-hours per kilogram (Wh/kg), whereas a metal-air battery made of a zinc material has an energy density of greater than 350 Wh/kg. A lithium-air battery may have an energy density approximately ten times greater than an existing mobile phone battery, and thus may have a high efficiency equivalent to that of gasoline to significantly reduce a volume and a weight of the battery.

The cathode 104 of the metal-air battery 100 undergoes an oxidation or reduction reaction using oxygen in air. Thus, the metal-air battery 100 includes the inlet 101 through which air flows in and the outlet 102 through which air flows out.

A reaction occurring in an anode and a cathode of the lithium-air battery, which is an example of the metal-air battery 100, may be expressed by Equations 1 and 2 below.

A reaction occurring in the anode of the lithium-air battery may be expressed by Equation 1 below, from which it can be seen that lithium (Li) is the active material of the anode.

$$2Li = 2Li^+ + 2e^- \quad (1)$$

In Equation 1, "Li" and "Li$^+$" denote lithium and lithium ion, respectively, and "e$^-$" denotes an electron.

A reaction occurring in the cathode of the lithium-air battery may be expressed by Equation 2 below, from which it can be seen that O$_2$ is the active material of the cathode.

$$2Li^+ + 2e^- + O_2 = Li_2O_2 \quad (2)$$

In Equation 2, "O$_2$" denotes oxygen in air, and "Li$_2$O$_2$" denotes lithium peroxide.

Thus, an overall reaction occurring in the anode and the cathode of the lithium-air battery may be expressed by Equation 3 below.

$$2Li + O_2 = Li_2O_2 \quad (3)$$

When one mole of oxygen reacts, two moles of electrons flow in a conducting wire. Thus, an amount of change in electrical charges of the metal-air battery 100 may be detected based on an amount of oxygen consumption of the metal-air battery 100.

Figure 2:
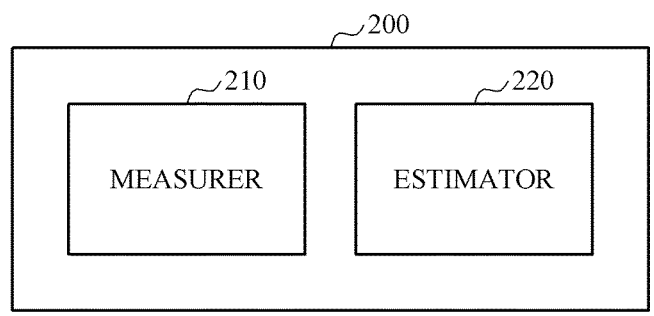
FIG. 2 is a diagram illustrating an example of an apparatus for estimating a state of charge (SoC) of a metal-air battery.

FIG. 2 is a diagram illustrating an example of an apparatus for estimating a state of charge (SoC) of a metal-air battery. Hereinafter, the apparatus for estimating an SoC of a metal-air battery will be referred to as an SoC estimating for simplicity.

Referring to FIG. 2, the SoC estimating apparatus 200 includes a measurer 210 and an estimator 220.

The measurer 210 measures an amount of oxygen consumption of the metal-air battery. The measurer 210 measures an amount and an oxygen concentration of air flowing into a cathode of the metal-air battery, and measures an amount and an oxygen concentration of air flowing out of the cathode of the metal-air battery.

The measurer 210 measures the amount and the oxygen concentration of the air flowing into an inlet of the metal-air battery, and the amount and the oxygen concentration of the air flowing out of an outlet of the metal-air battery. The measurer 210 is attached to the inlet 101 of FIG. 1 through which air is supplied to the cathode 104 of the metal-air battery 100, and to the outlet 102 of FIG. 1 through which air flows out of the cathode 104 of the metal-air battery 100.

The measurer 210 may use, as the amount of oxygen consumption of the metal-air battery, a value obtained by subtracting a product value obtained by multiplying the amount of the air flowing out of the cathode of the metal-air battery by the oxygen concentration of the air flowing out of the cathode of the metal-air battery from a product obtained by multiplying the amount of the air flowing into the cathode of the metal-air battery by the oxygen concentration of the air flowing into the cathode of the metal-air battery.

An example of the measurer 210 will be described with reference to FIGS. 3 and 4.

The estimator 220 estimates an SoC of the metal-air battery based on the amount of oxygen consumption of the metal-air battery. The estimator 220 detects an amount of change in electrical charges of the metal-air battery based on the amount of oxygen consumption measured by the measurer 210. In one example, the estimator 220 calculates the amount of change in electrical charges of the metal-air battery by performing an integral method or an integration on an amount of oxygen consumption of the cathode of the metal-air battery.

For example, when the amount of oxygen consumption measured by the measurer 210 is 10 moles, 20 moles of electrons flow in a conducting wire connected to the metal-air battery, and a remaining amount of unreacted metal in the anode may be estimated based on an initial amount of unreacted metal in the anode that is known in advance. Thus, the estimator 220 estimates SoC information on an amount of charge remaining in the metal-air battery.

The estimator 220 estimates the SoC of the metal-air battery based on the amount of change in electrical charges of the metal-air battery. A method of estimating an SoC of a battery based on an amount of change in electrical charges of the battery may be performed based on the amount of change in electrical charges of the battery obtained using a current integral method.

Figure 3:
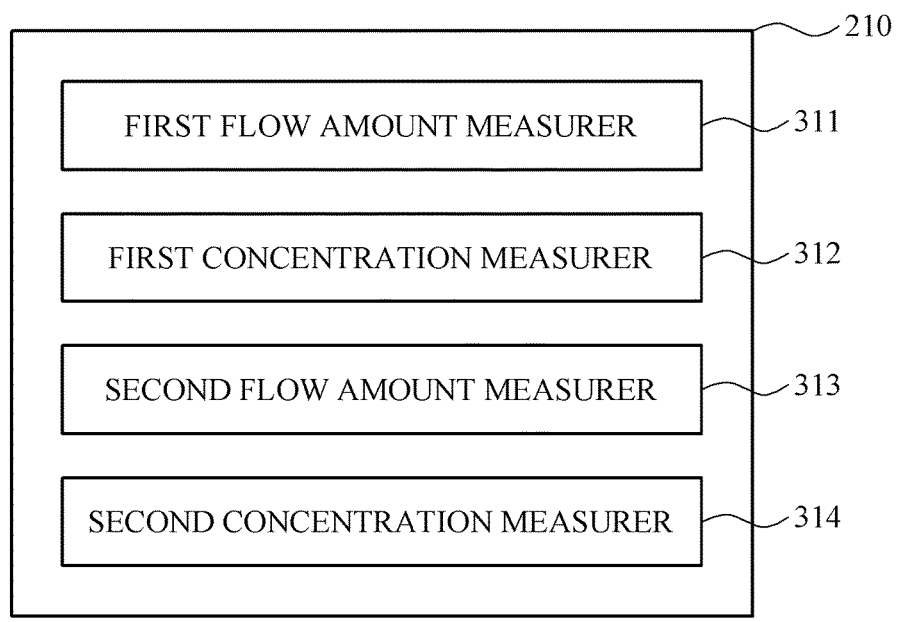
FIG. 3 is a diagram illustrating an example of a measurer of an apparatus for estimating an SoC of a metal-air battery.

FIG. 3 is a diagram illustrating an example of a measurer 210 of an SoC estimating apparatus of a metal-air battery.

Referring to FIG. 3, the measurer 210 includes a first flow amount measurer 311, a first concentration measurer 312, a second flow amount measurer 313, and a second concentration measurer 314. The measurer 210 calculates an amount of oxygen consumption of the metal-air battery using the first flow amount measurer 311, the first concentration measurer 312, the second flow amount measurer 313, and the second concentration measurer 314.

The first flow amount measurer 311 measures an amount of air flowing into a cathode of the metal-air battery. The first flow amount measurer 311 is attached to the inlet 101 of FIG. 1 through which air flows into the cathode 104 of the metal-air battery 100. Thus, the first flow amount measurer 311 measures the amount of air flowing into through the inlet 101.

The first concentration measurer 312 measures an oxygen concentration of the air flowing into the cathode of the metal-air battery. The first concentration measurer 312 is attached to the inlet 101 supplying air to the cathode 104 of the metal-air battery 100. Thus, the first concentration measurer 312 measures the oxygen concentration of the air flowing into the inlet 101.

The second flow amount measurer 313 measures an amount of air flowing out of the cathode of the metal-air battery. The second flow amount measurer 313 is attached to the outlet 102 of FIG. 1 through which air flows out of the cathode 104 of the metal-air battery 100. Thus, the second flow amount measurer 313 measures the amount of air flowing out of the outlet 102.

The second concentration measurer 314 measures an oxygen concentration of the air flowing out of the cathode of the metal-air battery. The second concentration measurer 314 is attached to the outlet 102 through which air flows out of the cathode 104 of the metal-air battery 100. Thus, the second concentration measurer 314 measures the oxygen concentration of the air flowing out of the outlet 102.

In one example, the measurer 210 may use, as the amount of oxygen consumption of the metal-air battery, a value obtained by subtracting a product value obtained by multiplying the amount of the air flowing out of the cathode of the metal-air battery by the oxygen concentration of the air flowing out of the cathode of the metal-air battery from a product value obtained by multiplying the amount of the air flowing into the cathode of the metal-air battery by the oxygen concentration of the air flowing into the cathode of the metal-air battery.

The first flow amount measurer 311 and the second flow amount measurer 313 may be configured as a single measurer. That is, a single processor may measure the amount of air flowing into the inlet 101 and the amount of air flowing out of the outlet 102.

The first concentration measurer 312 and the second concentration measurer 314 may be configured as a single measurer. That is, a single processor may measure the oxygen concentration in air flowing into the inlet 101 and the oxygen concentration in air flowing out of the outlet 102.

Figure 4:
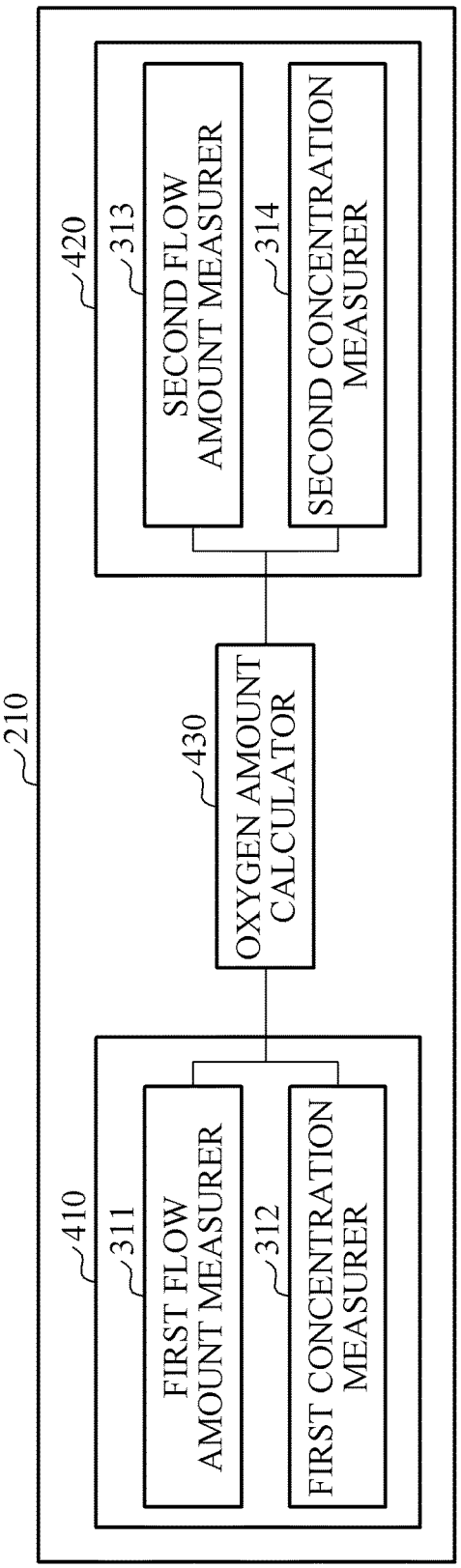
FIG. 4 is a diagram illustrating another example of a measurer of an apparatus for estimating an SoC of a metal-air battery.

FIG. 4 is a diagram illustrating another example of a measurer 210 of an SoC estimating apparatus of a metal-air battery.

Referring to FIG. 4, the measurer 210 includes a first measurer 410, a second measurer 420, and an oxygen amount calculator 430.

The first measurer 410 includes a first flow amount measurer 311 and a first concentration measurer 312. The first measurer 410 is connected to an air inlet of a cathode of the metal-air battery.

The first flow amount measurer 311 measures an amount of air flowing into the metal-air battery. The first flow amount measurer 311 is connected to the air inlet of the cathode of the metal-air battery.

The first concentration measurer 312 measures an oxygen concentration of air flowing into the metal-air battery. The first concentration measurer 312 is connected to the air inlet of the cathode of the metal-air battery.

The second measurer 420 includes a second flow amount measurer 313 and a second concentration measurer 314. The second measurer 420 is connected to an air outlet of a cathode of the metal-air battery.

The second flow amount measurer 313 measures an amount of air flowing out of the metal-air battery. The second flow amount measurer 313 is connected to the air outlet of the cathode of the metal-air battery.

The second concentration measurer 314 measures an oxygen concentration of the air flowing out of the metal-air battery. The second concentration measurer 314 is connected to the air outlet of the cathode of the metal-air battery.

The oxygen amount calculator 430 calculates an amount of oxygen flowing into the cathode of the metal-air battery by multiplying the amount of air measured by the first flow amount measurer 311 by the oxygen concentration in air measured by the first concentration measurer 312. Similarly, the oxygen amount calculator 430 calculates an amount of oxygen flowing out of the metal-air battery by multiplying the amount of air measured by the second flow amount measurer 313 by the oxygen concentration in air measured by the second concentration measurer 314.

In one example, the oxygen amount calculator 430 calculates an amount of oxygen consumed in the metal-air battery using Equation 4 below.

$$\text{Oxygen consumption} = Q_{air\_in} * m_{O_2\_in} - Q_{air\_out} * m_{O_2\_out} \quad (4)$$

In Equation 4, "$Q_{air\_in}$" denotes an amount of air flowing into the cathode of the metal-air battery, and "$m_{O_2\_in}$" denotes an oxygen concentration of the air flowing into the cathode of the metal-air battery. "$Q_{air\_out}$" denotes an amount of air flowing out of the cathode of the metal-air battery, and "$m_{O_2\_out}$" denotes an oxygen concentration of the air flowing out of the cathode of the metal-air battery.

Figure 5:
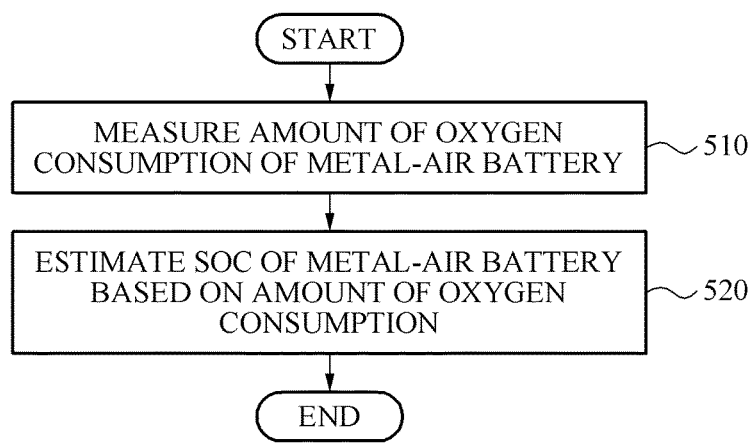
FIG. 5 is a flowchart illustrating an example of a method of estimating an SoC of a metal-air battery.

FIG. 5 is a flowchart illustrating an example of a method of estimating an SoC of a metal-air battery.

Referring to FIG. 5, in operation 510, the method measures an amount of oxygen consumption of the metal-air battery. The method measures an amount and an oxygen concentration of air flowing into a cathode of the metal-air battery, and measures an amount and an oxygen concentration of air flowing out of the cathode of the metal-air battery.

In operation 520, the method estimates an SoC of the metal-air battery. The method estimates the SoC of the metal-air battery based on the amount of oxygen consumption measured in operation 510. The method detects an amount of change in electrical charges of the metal-air battery based on the amount of oxygen consumption measured in operation 510. An integral method or integration is performed on the amount of oxygen consumption of the metal-air battery to calculate the amount of change in electrical charges of the metal-air battery. Thus, the SoC of the metal-air battery is estimated based on the amount of change in electrical charges of the metal-air battery. The method of estimating the SoC based on an amount of change in electrical charges may be performed based on the amount of change in electrical charges obtained using a current integral method.

Figure 6:
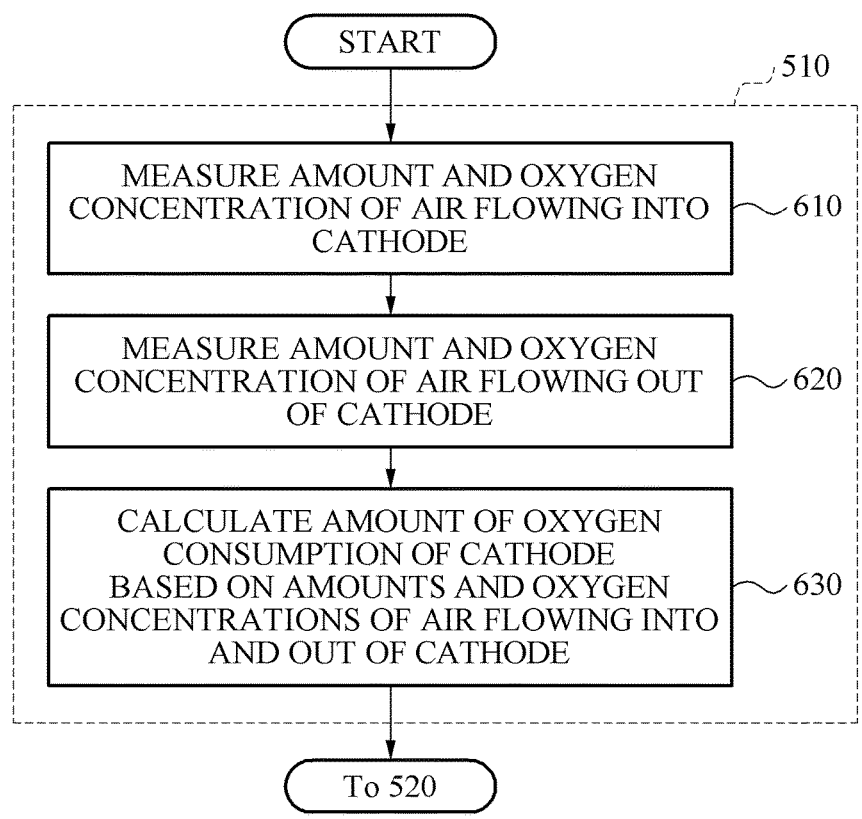
FIG. 6 is a flowchart illustrating an example of a method of measuring an amount of oxygen consumption of a cathode of a metal-air battery in operation 510 of FIG. 5.

FIG. 6 is a flowchart illustrating an example of a method of measuring an amount of oxygen consumption of a cathode of a metal-air battery in operation 510 of FIG. 5.

Referring to FIG. 6, in operation 610, the method measures an amount and an oxygen concentration of air flowing into the cathode of the metal-air battery. In one example, the method measures an amount of air flowing into the inlet 101 of FIG. 1 supplying air to the cathode 104 of the metal-air battery 100, and measures an oxygen concentration of the air flowing into the inlet 101 supplying air to the cathode 104 of the metal-air battery 100.

In operation 620, the method measures an amount and an oxygen concentration of air flowing out of the cathode of the metal-air battery. In one example, the method measures an amount of air flowing out of the outlet 102 of FIG. 1 through which air flows out of the cathode 104 of the metal-air battery 100, and measures the oxygen concentration of the air flowing out of the outlet 102 through which air flows out of the cathode 104 of the metal-air battery 100.

In operation 630, the method calculates an amount of oxygen consumption of the cathode of the metal-air battery. In one example, the method determines the amount of oxygen consumption to be a value obtained by subtracting a product value obtained by multiplying the amount of the air flowing out of the cathode of the metal-air battery by the oxygen concentration of the air flowing out of the cathode of the metal-air battery from a product value obtained by multiplying the amount of the air flowing into the cathode of the metal-air battery by the oxygen concentration of the air flowing into the cathode of the metal-air battery.

Figure 7:
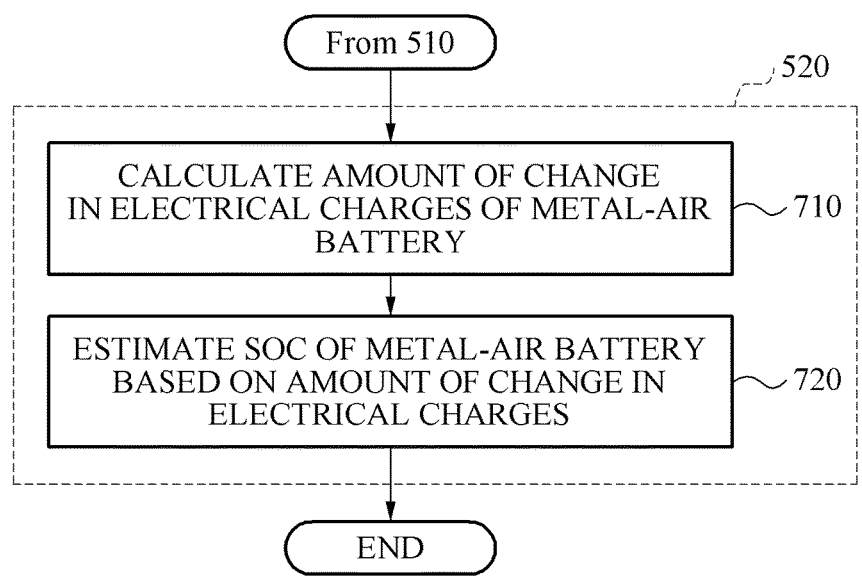
FIG. 7 is a flowchart illustrating an example of a method of estimating an SoC of a metal-air battery in operation 520 of FIG. 5.

FIG. 7 is a flowchart illustrating an example of a method of estimating an SoC of a metal-air battery in operation 520 of FIG. 5.

Referring to FIG. 7, in operation 710, the method calculates an amount of change in electrical charges of the metal-air battery. In one example, the method performs an integral method or integration on an amount of oxygen consumption of the metal-air battery to calculate the amount of the change in electrical charges of the metal-air battery.

In operation 720, the method estimates an SoC of the metal-air battery based on the amount of change in the electrical charges of the metal-air battery. In one example, the metal-air battery is charged or discharged by the amount of change in the electrical charges of the metal-air battery.

The SoC estimating apparatus 200 and the estimator 220 in FIG. 2, the measurer 210 in FIGS. 2-4, the first flow amount measurer 311, the first concentration measurer 312, the second flow amount measurer 313, the second concentration measurer 314 in FIGS. 3 and 4, and the first measurer 410, the second measurer 420, and the oxygen amount calculator 430 in FIG. 4 that perform the operations described herein with respect to FIGS. 1-7 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-7 that perform the operations described herein with respect to FIGS. 1-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for generating an estimated state of charge (SoC) of a metal-air battery, the apparatus comprising:

a measurer configured to measure an amount of oxygen consumption of the metal-air battery by measuring an amount of oxygen flowing into a cathode of the metal-air battery and measuring an amount of oxygen flowing out of the cathode of the metal-air battery; and an estimator configured to generate the estimated SoC of the metal-air battery by performing a mathematical operation on the measured amount of oxygen consumption.

2. The apparatus of claim 1, wherein the measurer comprises a first measurer configured to measure the amount of oxygen flowing into the metal-air battery, and a second measurer configured to measure the amount of oxygen flowing out of the metal-air battery.

3. The apparatus of claim 2, wherein the first measurer comprises a first flow amount measurer configured to measure an amount of air flowing into the cathode of the metal-air battery, and a first concentration measurer configured to measure an oxygen concentration of the air flowing into the cathode of the metal-air battery.

4. The apparatus of claim 2, wherein the second measurer comprises a second flow amount measurer configured to measure an amount of air flowing out of the cathode of the metal-air battery, and a second concentration measurer configured to measure an oxygen concentration of the air flowing out of the cathode of the metal-air battery.

5. The apparatus of claim 2, wherein the measurer further comprises an oxygen amount calculator configured to calculate an amount of oxygen consumption of the cathode of the metal-air battery based on the amount of oxygen flowing into the cathode of the metal-air battery and the amount of oxygen flowing out of the cathode of the metal-air battery.

6. The apparatus of claim 1, wherein the estimator is further configured to calculate an amount of change in electrical charges of the cathode of the metal-air battery based on the measured amount of oxygen consumption.

7. The apparatus of claim 6, wherein the estimator is further configured to generate the estimated SoC of the metal-air battery based on the calculated amount of change in electrical charges.

8. A method of generating an estimated state of charge (SoC) of a metal-air battery, the method comprising: measuring an amount of oxygen consumption of the metal-air battery by measuring an amount of oxygen flowing into a cathode of the metal-air battery and measuring an amount of oxygen flowing out of the cathode of the metal-air battery; and generating the estimated SoC of the metal-air battery by performing a mathematical operation on the measured amount of oxygen consumption.

9. The method of claim 8, wherein the measuring of the amount of oxygen flowing into the cathode comprises measuring an amount of air flowing into the cathode of the metal-air battery, and measuring an oxygen concentration of the air flowing into the cathode of the metal-air battery.

10. The method of claim 8, wherein the measuring of the amount of oxygen flowing out of the cathode comprises measuring an amount of air flowing out of the cathode of the metal-air battery, and measuring an oxygen concentration of the air flowing out of the cathode of the metal-air battery.

11. The method of claim 8, wherein the measuring of the amount of oxygen consumption of the metal-air battery further comprises calculating an amount of oxygen consumption of the cathode of the metal-air battery based on the amount of oxygen flowing into the cathode of the metal-air battery and the amount of oxygen flowing out of the cathode of the metal-air battery.

12. The method of claim 8, wherein the estimating of the SoC of the metal-air battery comprises calculating an amount of change in electrical charges of the metal-air battery based on the measured amount of oxygen consumption.

13. The method of claim 12, wherein the generating of the estimated SoC further comprises generating the estimated SoC of the metal-air battery based on the calculated amount of change in electrical charges of the metal-air battery.

14. A non-transitory computer-readable medium storing instructions that, when executed by a processor, cause the processor to perform the method of claim 8.

15. An apparatus for generating an estimated state of charge (SoC) of a metal-air battery, the apparatus comprising: a measurer configured to measure an amount of consumption of an electrode of the metal-air battery by measuring an amount of oxygen flowing into a cathode of the metal-air battery and measuring an amount of oxygen flowing out of the cathode of the metal-air battery; and an estimator configured to generate the estimated SoC of the metal-air battery by performing a mathematical operation on the measured amount of consumption of the electrode.

16. The apparatus of claim 15, wherein the measurer comprises a first measurer configured to measure an amount of oxygen consumed during discharge of the metal-air battery, a second measurer configured to measure a concentration of the oxygen consumed during the discharge of the metal-air battery, and a calculator configured to calculate the amount of consumption of the electrode of the metal-air battery by multiplying the measured amount of oxygen consumed during the discharge of the metal-air battery by the measured concentration of the oxygen consumed during the discharge of the metal-air battery.

17. The apparatus of claim 15, wherein the estimator is further configured to calculate an amount of change in electrical charges of the metal-air battery based on the measured amount of consumption of the electrode.

18. The apparatus of claim 17, wherein the estimator is further configured to generate the estimated SoC of the metal-air battery based on the calculated amount of change in electrical charges of the metal-air battery.

19. The apparatus of claim 15, wherein the electrode of the metal-air battery is air.

20. The apparatus of claim 1, wherein the measurer is further configured to determine the amount of oxygen consumption of the metal-air battery by subtracting the amount of oxygen flowing out of the cathode of the metal-air battery from the amount of oxygen flowing into the cathode of the metal-air battery.

21. The apparatus of claim 20, wherein
the amount of oxygen flowing out of the cathode of the metal-air battery is obtained by multiplying an amount of air flowing out of the cathode of the metal-air battery by an oxygen concentration of the air flowing out of the cathode of the metal-air battery, and
the amount of oxygen flowing into of the cathode of the metal-air battery is obtained by multiplying an amount of the air flowing into the cathode of the metal-air battery by an oxygen concentration of the air flowing into the cathode of the metal-air battery.

22. The apparatus of claim 1, wherein the mathematical operation includes an integration of the measured amount of oxygen consumption.

* * * * *